(12) United States Patent
Chen et al.

(10) Patent No.: US 7,287,757 B2
(45) Date of Patent: Oct. 30, 2007

(54) OPTIMIZED WAVE BEAD WITH FULL BEAD DESIGN

(75) Inventors: Colin C. Chen, Barrington, IL (US); Frank W. Popielas, Plainfield, IL (US); Rohit Ramkumar, Romeoville, IL (US); Thomas P. Plunkett, Plainfield, IL (US); Jeffery A. Foster, Rolling Meadows, IL (US)

(73) Assignee: Dana Corporation, Toledo, OH (US)

( * ) Notice: Subject to any disclaimer, the term of this patent is extended or adjusted under 35 U.S.C. 154(b) by 104 days.

(21) Appl. No.: 11/168,271

(22) Filed: Jun. 28, 2005

(65) Prior Publication Data

US 2006/0290072 A1 Dec. 28, 2006

(51) Int. Cl.
*F02F 11/00* (2006.01)

(52) U.S. Cl. .................. 277/593; 277/592; 277/595

(58) Field of Classification Search ......... 277/592–596
See application file for complete search history.

(56) References Cited

U.S. PATENT DOCUMENTS

| 6,131,915 A | * | 10/2000 | Nicholson | 277/593 |
| 6,250,645 B1 | * | 6/2001 | Udagawa | 277/595 |
| 6,769,696 B2 | * | 8/2004 | Diez et al. | 277/593 |
| 2002/0079651 A1 | * | 6/2002 | Unseld et al. | 277/592 |
| 2004/0041352 A1 | * | 3/2004 | Hohe et al. | 277/593 |
| 2004/0183260 A1 | * | 9/2004 | Kestly | 277/593 |
| 2005/0200083 A1 | * | 9/2005 | Udagawa et al. | 277/592 |
| 2006/0192347 A1 | * | 8/2006 | Popielas | 277/593 |

* cited by examiner

*Primary Examiner*—Alison K Pickard
(74) *Attorney, Agent, or Firm*—Marshall & Melhorn, LLC

(57) ABSTRACT

A gasket having a layer including at least one combustion opening and a wave area located on the layer is disclosed. The wave area includes a first wave and a second wave. The first wave is proximate the combustion opening. A flat portion near the second wave includes a first end and a second end. A full bead is located next to the second end of the flat portion whereby a lower surface of the flat portion is above the lower projecting surfaces of the wave area.

17 Claims, 1 Drawing Sheet

OPTIMIZED WAVE BEAD WITH FULL BEAD DESIGN

TECHNICAL FIELD

The embodiments of the invention described herein are generally directed to sealing gaskets.

BACKGROUND

Gaskets made of a metal material have been used to seal a joint where a cylinder head interfaces with a cylinder block of an engine. There are openings in the gasket which cooperate with the combustion chambers, water passages and oil passages in the engine. These gasket openings typically have a structure to enhance sealing around the openings.

Cylinder head gaskets are the most sophisticated type of gaskets. When first starting an engine in cold weather, parts near the combustion chamber might be subfreezing. Then, after only a few minutes of engine operation, these same parts may reach 400 degrees Fahrenheit. The inner edges of the cylinder head gaskets are exposed to combustion flame temperatures from 2,000 to 3,000 degrees Fahrenheit.

Pressures inside the combustion chamber also vary tremendously. On the intake stroke, a vacuum or low pressure exists in the cylinder. Then after combustion, pressure peaks of approximately 1,000 pounds per square inch (psi) occur. This extreme change from suction to high pressure happens in a fraction of a second. Cylinder head gaskets, under these conditions must also provide the following: seal intake stroke vacuum, combustion pressure, and the flame in the combustion chamber; prevent coolant leakage, resist rust, corrosion and, in many cases, meter coolant flow; seal oil passages through the engine block and engine head while resisting chemical action; allow for lateral and vertical head movement as the engine heats and cools; be flexible enough to seal minor surface warpage while being stiff enough to maintain adequate gasket compression; fill small machining marks that could lead to serious gasket leakage failure; and withstand forces produced by engine vibration.

Known ways to enhance gasket opening sealing includes the use of metal plates having wave beads. However, the gaskets with wave beads provide uneven sealing pressure patterns and shift the heavy load away from the desired wave area. When the heavy load is shifted away from the desired wave area onto a flat portion of the gasket, the sealing pressure is decreased. Moreover, this localized excessive loading accelerates the cracking failure at the flat portion of the gasket.

Therefore, there is a need for a cylinder head gasket that creates an even sealing pressure pattern at the wave area. It would be desirable to provide load shifting that reduces premature cracking failure by properly distributing the load along the wave area so that the load is not concentrated at the flat portion. The load should be distributed evenly throughout the entire region of the seal where the load is desired.

BRIEF SUMMARY

The embodiments described herein are directed to a gasket having a metal layer including at least one combustion opening and a wave area located on the layer. The wave area includes a first wave and a second wave. The first wave is proximate the combustion opening. A flat portion near the second wave includes a first end and a second end. A full bead is located next to the second end of the flat portion whereby a lower surface of the flat portion is above the lower projecting surfaces of the wave area.

BRIEF DESCRIPTION OF THE DRAWINGS

The features and inventive aspects of an embodiment described herein will become more apparent upon reading the following detailed description, claims, and drawings, of which the following is a brief description:

DETAILED DESCRIPTION

Figure 1:
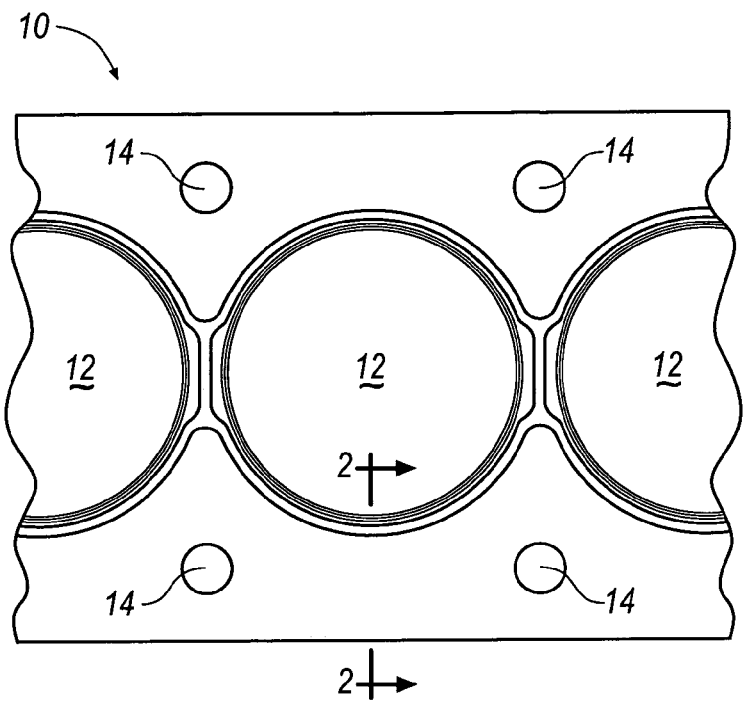
FIG. 1 is a partial plan view of a metal gasket according to one embodiment.

Referring now to the drawings, an illustrative embodiment is shown in detail. Although the drawings represent an embodiment, the drawings are not necessarily to scale and certain features may be exaggerated to better illustrate and explain the innovative aspects of the embodiment. Further, the embodiments described herein are not intended to be exhaustive or otherwise limit or restrict the invention to the precise form and configuration shown in the drawings and disclosed in the following detailed description.

Figure 2:
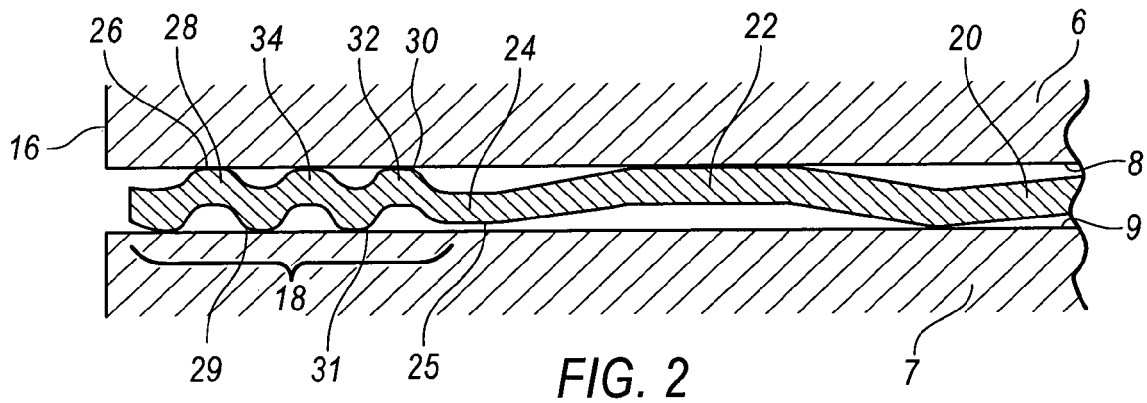
FIG. 2 is a sectional view along section 2-2 in FIG. 1 showing an embodiment of a single layer gasket having a wave area and a full bead.

Referring to FIGS. 1 and 2, a cylinder head 6 and a cylinder block 7 of an internal-combustion engine have opposed surfaces 8, 9 that require proper sealing. A metal gasket 10 is adapted to be held between the cylinder head 6 and the cylinder block 7 and seal the clearances between the opposed surfaces 8, 9 thereof. The metal gasket 10 is applied to a multi-cylinder engine corresponding to cylinder bores (not shown) formed in the cylinder block. A plurality of cylinder bore holes 12 or combustion chamber holes are formed side by side. The metal gasket 10 has various kinds of holes including water holes (not shown), oil holes (not shown), and bolt holes 14 around the cylinder bore holes 12.

Now referring to FIG. 2, the metal gasket 10 includes a wave area 18 disposed proximate a cylinder bore edge 16. The wave area 18 includes at least two waves that may be formed in a single sheet metal layer 20. The metal gasket 10 further includes at least one full bead 22. In one embodiment, the wave area 18 may include a plurality of undulating waves. However, any full bead may be used for full bead 22 and any plurality of waves may be used for the wave area 18. The single sheet metal layer 20 may also be incorporated into a multi-layered steel (MLS) gasket (not shown) having a stopper layer and an active layer. An embodiment of the metal gasket 10 may be formed from any metal but preferably from a 301 stainless steel having its thickness determined by the user as required.

Each cylinder bore hole 12 is sealed off to prevent combustion gasses from escaping by the wave area 18 and the full bead 22 surrounding the cylinder bore. The wave area 18 provides cross-sectionally projecting waves, which extend along the circumference of each cylinder bore hole 12. A flat portion 24 is disposed between the wave area 18 and the full bead 22 having a flat portion lower surface 25. The wave area 18 is formed so that a projecting upper first surface 26 of a first wave 28 and a projecting upper second surface 30 of a second wave 32 are generally planer. Furthermore, the flat portion 24 is raised so that the flat portion lower surface 25 is initially about 10-100 microns above a lower first surface 29 of the first wave 28 and a lower second surface 31 of the second wave 32. A third wave 34 is shown positioned between the first and the second waves 28, 32. However, a plurality of waves may be included between the first wave 28 and the second wave 32. In a second embodiment, the upper first surface 26 of the first wave 28 projects upwardly from the projecting upper second surface 30 of the second wave 32.

During operation of the engine, the metal gasket 10 is set between the opposed surfaces of the cylinder head 8 and the cylinder block 9 and tightened by a clamping mechanism. In one embodiment, the clamping mechanism includes bolts, however, other suitable clamping mechanisms may be used. With the metal gasket 10 installed, the full bead 22 and the wave area 18 elastically deform in a spring-like fashion to the metal layer 20. The wave area 18 creates a uniform sealing pressure pattern at the wave area 18 having the flat portion 24 raised so that the flat portion lower surface 25 is initially about 10-100 microns above the lower first surface 29 of the first wave 28 and the lower second surface 31 of the second wave 32. This load shifting reduces premature cracking failure at the flat portion 24 by properly distributing the load along the wave area 18 so that the load is not concentrated at the flat portion 24 between the wave area 18 and the full bead 22. Instead, the load is distributed evenly throughout the entire region of the wave area 18 where the load is desired.

Figure 3:
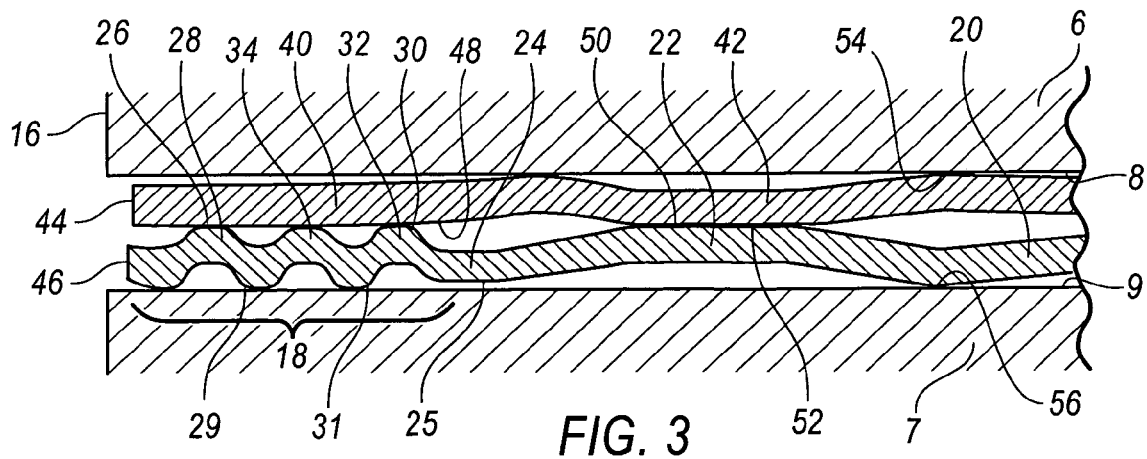
FIG. 3 is a sectional view along section 2-2 in FIG. 1 showing an embodiment of a multi-layer gasket having an active layer and a wave bead layer.

Referring to FIG. 3, an embodiment of the metal gasket 10 is shown including an active layer 40 forming a multi-layered gasket. The gasket 10 includes two metal layers 20, 40 mounted atop the other. However, any number of layers may be used. In the illustrated embodiment, lower metal layer 20 includes the same general construction and seal arrangement as the single layer metal gasket 10 described above.

The upper metal layer 40 includes a bead 42 and generally may have additional beads provided. The upper metal layer 40 may be formed from steel, stainless steel, or the like. The multi-layer gasket is constructed such that an upper end 44 is generally aligned with a lower end 46 proximate the cylinder bore edge 16. A lower flat surface 48 of the upper metal layer 40 is generally in sealing contact with at least the upper first surface 26 of the first wave 28. Beads 22 and 42 are generally aligned so that a lower surface 50 of the upper metal layer 40 is in operational communication with an upper surface 52 of the lower metal layer 20. At least a portion of an active layer upper surface 54 is in contact with the cylinder head surface 8 and at least a portion of a wave bead layer lower surface 56 is in contact with the cylinder block surface 9. The shape of the beads may be selected from any commonly know geometric shape and may be varied to achieve uniform sealing stresses in both layers.

To control seal operating thickness, one or more design parameters may be varied, including, but not limited to, bead width, bead depth, bead shape, and plate thickness. Such control provides the ability to easily customize the metal gasket 10 for a particular gasket application. The metal gasket 10 may also include an elastomeric coating having a thickness between 0.001 millimeters and 0.05 millimeters. However, thicker coatings may be used. The coating is a Dana Corporation F50 coating; however, other like coatings may be used. The coating performs a sealing function.

The embodiments herein have been particularly shown and described, which are merely illustrative of the best mode for carrying out the invention. It should be understood by those skilled in the art that various alternatives to the embodiments described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A gasket comprising:
   a single layer having at least one combustion opening, said single layer comprising:
   a wave area having at least a first wave and a second wave, said first wave being proximate said combustion opening;
   a flat portion having a first end, a second end and a flat portion lower surface, said first end being proximate said second wave; and
   a full bead having a bead lower surface and being proximate said second end of said flat portion;
   wherein at least a portion of said bead lower surface is in direct contact with a cylinder block surface, at least a portion of an upper surface of said first wave is in direct contact with a cylinder head surface, and said flat portion lower surface is disposed above a first lower surface of said first wave.

2. The gasket of claim 1, wherein said gasket is a metal gasket.

3. The gasket of claim 2, wherein said metal gasket is formed from one of a 301 stainless steel, annealed stainless steel, or annealed low carbon steel.

4. The gasket of claim 1, wherein said single layer is a stopper layer.

5. The gasket of claim 1, wherein said full bead is larger than said first wave of said wave area.

6. The gasket of claim 1, wherein said wave area is defined as a plurality of waves.

7. The gasket of claim 1, wherein said flat portion lower surface is about 10 to 100 microns above said first lower surface of said first wave.

8. The gasket of claim 1, wherein said layer thickness is at least 0.1 millimeters.

9. The gasket of claim 1, wherein said layer further comprises a coating.

10. The gasket of claim 9, wherein said coating is an elastomeric coating.

11. The gasket of claim 9, wherein said coating is between 0.001 millimeters and 0.05 millimeters thick.

12. A gasket comprising:
    an active layer having a lower flat surface, having at least one bead, and having at least one combustion opening;
    a wave bead layer having said active layer disposed atop thereof, said wave bead layer comprising:
    a first layer end and a second layer end and at least one combustion opening, said wave bead layer being in operational communication with said active layer;
    a wave area disposed proximate said first layer end having at least a first wave and a second wave, said first wave being proximate said combustion opening;
    a flat portion having a first end, a second end, and a flat portion lower surface, said first end being proximate said second wave; and a full bead having a bead lower surface and being proximate said second flat end of said flat portion;

wherein at least a portion of said bead lower surface is in direct contact with a cylinder block surface, said active layer lower flat surface is in sealing contact with at least an upper first surface of said first wave, at least a portion of an upper surface of said active layer is in direct contact with a cylinder head surface, and said flat portion lower surface is disposed above a first lower surface of said first wave.

13. The gasket of claim 12, wherein said active layer includes a second full bead.

14. The gasket of claim 13, wherein said full bead and said second full bead are in mechanical communication.

15. The gasket of claim 13, wherein said second full bead includes a larger bead than said first wave of said wave area.

16. The gasket of claim 12, wherein said gasket is a metal gasket.

17. The gasket of claim 16, wherein said metal gasket is a multi-layered steel gasket.

* * * * *